W. H. RAPEPORT.
SUPPORTING ATTACHMENT FOR AUTOMOBILE FENDERS.
APPLICATION FILED AUG. 4, 1920.
1,366,934.
Patented Feb. 1, 1921.
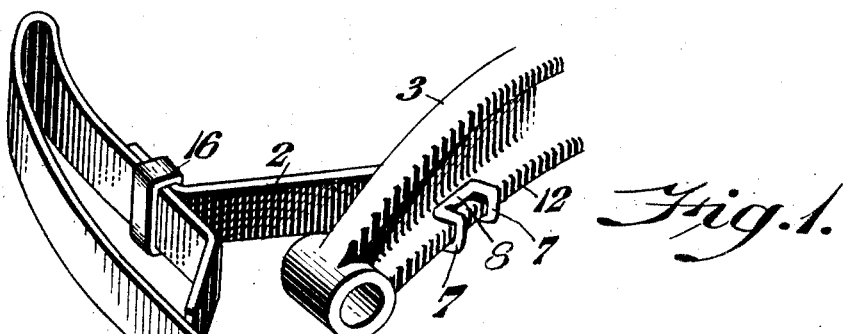
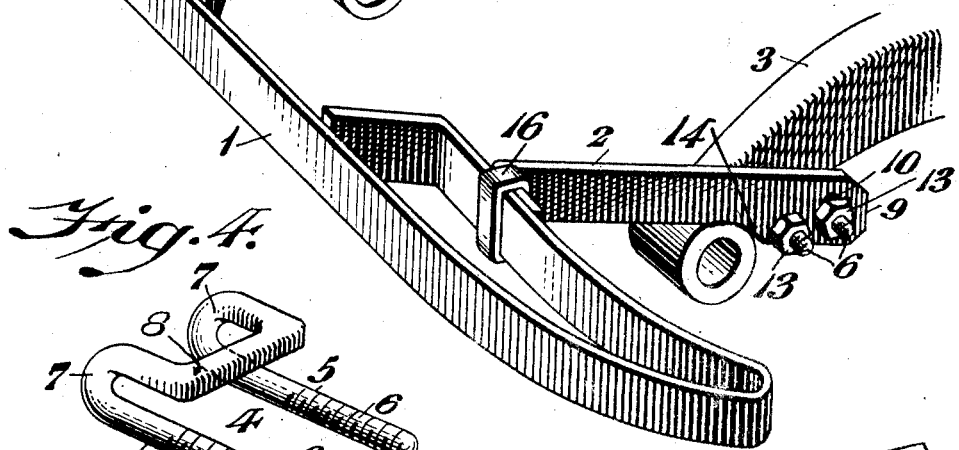
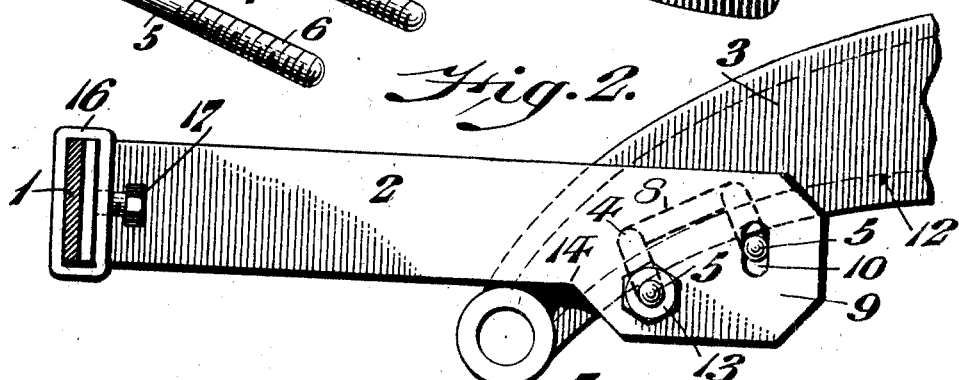
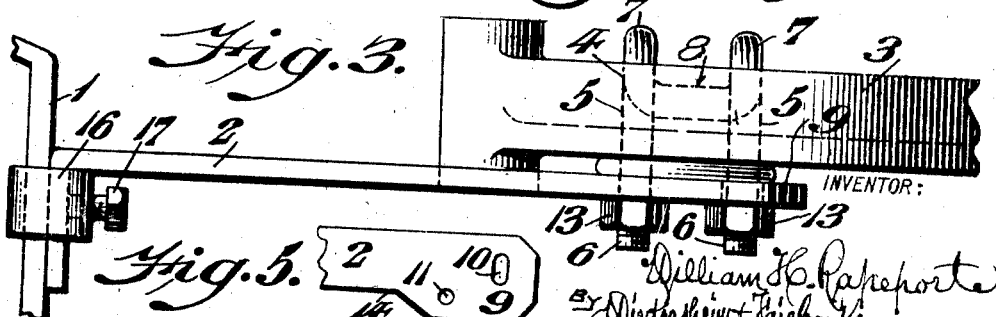
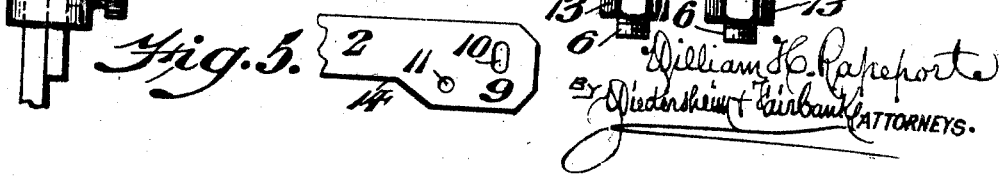

UNITED STATES PATENT OFFICE.

WILLIAM H. RAPEPORT, OF PHILADELPHIA, PENNSYLVANIA.

SUPPORTING ATTACHMENT FOR AUTOMOBILE-FENDERS.

1,366,934.   Specification of Letters Patent.   Patented Feb. 1, 1921.

Application filed August 4, 1920. Serial No. 401,110.

*To all whom it may concern:*

Be it known that I, WILLIAM H. RAPEPORT, a citizen of the United States, residing in the city and county of Philadelphia, State of Pennsylvania, have invented a new and useful Supporting Attachment for Automobile-Fenders, of which the following is a specification.

My invention consists of a device for clamping and so attaching a fender of an automobile or other vehicle to an adjacent portion of the chassis or frame of the latter in a firm, steady, inexpensive and reliable manner, the same embodying a clamp composed of a plurality of legs, and hooks which comprise a unitary member which is engageable with said portion of the chassis and arms which extend from said portion of the chassis and are adapted to carry and position the fender as will be hereinafter more fully set forth.

The invention is satisfactorily illustrated in the accompanying drawing but the important instrumentalities thereof may be varied, and so it is to be understood that the invention is not limited to the specific details shown and described, as long as they are within the spirit or scope of the claims.

Figure 1 represents a perspective view of an attachment for an automobile fender embodying my invention.

Fig. 2 represents a partial side elevation and partial vertical section on an enlarged scale.

Fig. 3 represents a top or plan view of the members shown in Fig. 2.

Fig. 4 represents a perspective view of the clamping member employed on an enlarged scale.

Fig. 5 represents a side elevation of a portion of one of the supporting arms employed.

Similar numerals of reference indicate corresponding parts in the figures.

Referring to the drawings.

1 designates a fender proper which is formed of a bar of resilient material such as steel or other suitable metal and 2 designates arms whose forward end has said bar clamped thereto and whose rear portions are connected with the adjacent portion 3 of the chassis or other proper member of an automobile or other vehicle, the parts thus far considered being known in the art.

4 designates a device or clamp which I employ for connecting said arms 2 with the portion 3 of the vehicle, which portion in the present case, I will hereafter designate as members of the chassis, said device consisting of the plurality of legs 5 which are screw threaded as at 6. The end of each leg opposite to the screw thread is bent on itself forming the hook 7 and so producing a plurality of hooks.

The terminals of each plurality of hooks are connected by the cross bar 8 as a brace, it being noticed that the legs, bends and cross bar are continuities of each other hence a unitary construction, said cross bar being adapted to prevent spreading of said hooks and legs.

In the rear portions 9 of each arm 2 is the segmental slot 10 and adjacent thereto the opening 11, see Figs. 2 and 3, the slot 10 being adapted to receive one of the legs of the clamping device and the opening 11 being adapted to receive the other leg thereof. Both legs pass under the chassis 3 and the hooks 7 pass over the side flanges 12 of the member 3 of the chassis and tightly embrace the same and so clamp the hooks on said flanges and consequently with the member 3.

On the threaded end of the legs 5 are the nuts 13 which are adapted to be tightened against the sides of the arms 2 and so retain the clamping devices 4 in position, the hooks and cross bars tightly clasping the flanges 12 and so connecting said arms with the member 3 in a most forcible manner and preventing the arms 2 and consequently the fender from dropping and losing its adjustment.

Attention is directed to the fact that the legs 5 of each pair of the clamping devices that pass through the openings 11 form axes for the arms 2, so that said arms may be raised and lowered for the purpose of adjusting the height of the fender, the raising and lowering of said arms being permitted owing to the segmental slot 10 in which relative portions of the other legs of the clamping device occupy freely, the nuts 13 of course having been loosened. Then when the adjustment of the fender is accomplished the arms 2 are controlled and the fender retained firmly in its adjusted position.

It will be noticed also that the rear ends of the arms 2 depend from the legs 5 and hooks 7 of the clamping devices 4, said legs comprising bolts for the purpose intended and passing under the members 3 of the chassis without piercing or perforating and consequently weakening the latter.

The under sides of the arms 2 are offset upwardly, as at 14, so that while the rear ends 9 of said arms possess a height to permit the slot 10 and opening 11 to be made therein without materially weakening said rear ends, the portions of said arms offset at 14 are permitted to lower to an extent to rest if so desired on the bosses or eyes 15 on the member 3 of the chassis, thus sustaining the arms intermediate of their ends as additional supports therefor and steadying them in position on the member of the chassis while also preventing any possible dropping of the arms from the member 3. The fender is connected with the arms 2 by means of the clamps 16 which embrace the adjacent portions of said fender and arms and are tightened in position by the set screws or bolts 17.

Having thus described my invention, what I claim as new and desire to secure by Letters Patent, is:—

1. A device for attaching a fender to a vehicle, consisting of an arm adapted to carry the fender, and a clamping member consisting of a plurality of legs and a plurality of hooks, and means for connecting the same as a unitary article, said clamping member being attached to said arm and engageable with a proper portion of a vehicle adjacent to the fender.

2. A device for attaching a fender to a vehicle, consisting of a plurality of legs, a plurality of hooks, and a brace member adapted to connect said hooks forming a unitary construction, said device being attachable to the support of said fender and a proper portion of the vehicle.

3. A device for attaching a fender to a vehicle, consisting of an arm adapted to support said fender, and a clamping device for connecting said arm with a member of the vehicle, said device consisting of a plurality of legs, a plurality of hooks, each on one of said legs, a brace joining said hooks, and nuts on said legs adapted to be tightened against said member of the vehicle.

4. A device for attaching a fender to a vehicle, consisting of an arm adapted to support said fender, and a clamping device for connecting said arm with a member of the vehicle, said device consisting of a plurality of legs, a plurality of hooks, each on one of said legs, a brace joining said hooks, and nuts on said legs adapted to be tightened against said member of the vehicle, said arm having therein an opening and a slot, said legs being adapted to occupy said slot and opening, adapting said arm to turn on the leg that occupies said opening as an axis for the arm for vertically adjusting the fender and said slot being adapted to receive the other leg permitting the turning motion of the arm, both legs being provided with nuts for tightening the arm on said member of the vehicle, the plurality of hooks being adapted to embrace a portion of said arm.

5. A device for attaching a fender to a vehicle, consisting of a plurality of legs, a plurality of hooks, and a brace connecting said hooks from side to side of the device, said legs, hooks and brace being a unitary construction, and nuts on said legs, said hooks being adapted to embrace a member of the vehicle and said legs to pass under an arm adapted to carry the fender and having openings adapted to receive said legs, said nuts being adapted to be tightened on the legs against said arm on a side of said member opposite to said hooks.

WILLIAM H. RAPEPORT.

Witnesses:
  JOHN A. WIEDERSHEIM,
  N. BUSSINGER.